(12) United States Patent
Iida (10) Patent No.: US 7,047,528 B2
(45) Date of Patent: May 16, 2006

(54) INFORMATION PROCESSING APPARATUS, INFORMATION PROCESSING METHOD, CONTROL PROGRAM, AND MEMORY MEDIUM STORING CONTROL PROGRAM THEREIN

(75) Inventor: Mitsunori Iida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 10/232,312

(22) Filed: Sep. 3, 2002

(65) Prior Publication Data

US 2003/0051069 A1 Mar. 13, 2003

(30) Foreign Application Priority Data

Sep. 12, 2001 (JP) ............................ 2001-276441

(51) Int. Cl.
G06F 9/44 (2006.01)

(52) U.S. Cl. .................. 717/170; 717/168; 726/26

(58) Field of Classification Search ........ 717/168–177; 713/200; 726/26
See application file for complete search history.

(56) References Cited

U.S. PATENT DOCUMENTS

| | | | | |
|---|---|---|---|---|
| 5,257,377 A * | 10/1993 | Sathi et al. | ................. | 717/170 |
| 5,729,624 A * | 3/1998 | Tanioka et al. | ............. | 382/162 |
| 5,745,686 A * | 4/1998 | Saito et al. | ................. | 717/168 |
| 5,832,210 A * | 11/1998 | Akiyama et al. | ........... | 713/202 |
| 6,134,663 A * | 10/2000 | Nakamura et al. | ............ | 726/26 |
| 6,280,105 B1 * | 8/2001 | Iida | .............................. | 400/74 |
| 6,330,717 B1 * | 12/2001 | Raverdy et al. | ............ | 717/170 |
| 6,404,914 B1 * | 6/2002 | Tanioka et al. | ............. | 382/162 |
| 6,578,149 B1 * | 6/2003 | Kawamae et al. | ............ | 726/26 |
| 6,594,237 B1 * | 7/2003 | Kiuchi et al. | ................ | 370/250 |
| 6,678,683 B1 * | 1/2004 | Shiiyama | ...................... | 707/10 |
| 6,691,228 B1 * | 2/2004 | Sako et al. | .................. | 713/193 |
| 6,809,831 B1 * | 10/2004 | Minari | ...................... | 358/1.15 |
| 6,816,972 B1 * | 11/2004 | Kutaragi et al. | ............ | 713/200 |
| 6,907,603 B1 * | 6/2005 | Scott | .......................... | 717/168 |
| 6,912,710 B1 * | 6/2005 | Broussard et al. | .......... | 717/170 |

FOREIGN PATENT DOCUMENTS

| | | |
|---|---|---|
| JP | 10-124435 | 5/1998 |
| JP | 2000-305757 | 11/2000 |
| JP | 2001-067225 | 3/2001 |

OTHER PUBLICATIONS

Ganger et al, "Soft updates: A solution to the the metadata update problem in file systems" ACM Trans on Computer Sys. vol. 18, No. 2 pp. 127-153, 2000.*

Gal et al, "Algorithms and data structures for flash memories", ACM Computing Surveys, vol. 37, No. 2, pp. 138-163, 2005.*

(Continued)

*Primary Examiner*—Anil Khatri
(74) *Attorney, Agent, or Firm*—Fitzpatrick, Cella, Harper & Scinto (57) ABSTRACT

A mechanism such that even in case of using a plug and play installer, a control program can be newly installed so that other existing control programs can hold matching performance is provided. For example, in an information processing apparatus having the plug and play installer, there is provided a discriminating unit for discriminating whether, when a first control program is installed by a program installing unit, a second control program corresponding to an external processing apparatus which has already been stored in the information processing apparatus enters a mismatching state or not.

28 Claims, 7 Drawing Sheets

OTHER PUBLICATIONS

Wang et al, "An archiecture for embedded software integration using reusable components", ACM CASE, pp. 110-118, 2000.*

Xu et al, "Inconsistency detection and resolution for contect aware middleware support", ACM ESEC, pp. 336-345, 2005.*

* cited by examiner

INFORMATION PROCESSING APPARATUS, INFORMATION PROCESSING METHOD, CONTROL PROGRAM, AND MEMORY MEDIUM STORING CONTROL PROGRAM THEREIN

BACKGROUND OF THE INVENTION

1. Field of the Invention

The invention relates to an information processing apparatus constructed in a manner such that, when it is connected to an external processing apparatus, control software corresponding to the connected external processing apparatus is installed.

2. Related Background Art

There is a printer driver as a preferable example of a control program for controlling various external processing apparatuses. The printer driver is software which is necessary to be installed into an OS in order to allow a printing apparatus such as a printer or the like as a preferred example of the external processing apparatus to execute a printing process from an application which operates on the OS. An installer for installing the printer driver into the OS implemented in a host computer has existed conventionally. A computer for obtaining a device ID as identification information peculiar to a device from the printing apparatus and installing the printer driver by using the device ID has been developed. Generally, since the printer driver is the software which differs for every apparatus, the operation to install it into the OS implemented into the host computer is troublesome.

Therefore, a function such that when the printing apparatus is connected to a system, the identification information showing information peculiar to the printing apparatus is obtained from the printing apparatus and the corresponding printer driver is installed (hereinafter, such a function is called a plug and play function), is added to the OS and usability for the user is improved. An installer corresponding to the plug and play which can easily install the plug and play as mentioned above (hereinafter, such an installer is called a plug and play installer) is provided. The plug and play installer is usually provided as a function of system software, for example, the operating system (OS).

In the plug and play installer, preparation is made so that the OS can recognize the information of the printer driver corresponding to the printing apparatus and, thereafter, in response to the operation for allowing the user to connect the printing apparatus, the device identification information is received from the device, the driver corresponding to the device identification information is specified, and the printer driver is installed.

Hitherto, since the development of the device driver has been made for every device, all modules in one device driver correspond to it. However, if a specific device driver is developed for a certain device as in the conventional manner, a developing period of time becomes long and a large burden is placed on a developer. In recent years, therefore, to reduce the number of developing steps, a countermeasure for dividing the device driver into a common module portion and a module portion peculiar to the device, thereby reducing the number of developing steps of the common module portion is taken. Therefore, in the development of the device driver corresponding to the specific device, it is sufficient to execute developing steps of the device peculiar module portion and the burden on the developer is reduced. In recent years, consequently, the device driver having a common module has become popular.

However, in the device driver having the common module, if the device driver is installed by the plug and play, the following problems occur. The plug and play installer specifies a control program to be installed on the basis of device IDs as identification information of various apparatuses such as an external processing apparatus and the like and installs the specified device driver as it is. Therefore, another existing control program is overwritten against an intent of the user. Since the common module of the device driver has been expanded more or less in accordance with an increase in line-up of the devices, if the overwriting process of the common module is executed, in the case where the device driver of the old version has already been installed in the system, there is a situation that a mismatch occurs in the software.

SUMMARY OF THE INVENTION

The invention is made to solve the above problems and in an embodiment of the invention, it is an object to provide a mechanism such that even in case of newly installing a control program by using a plug and play installer, another existing control program is not subjected to unintentional overwriting by a program which is installed but matching performance can be held. As a construction to accomplish the above object, the following means are provided.

According to a preferred aspect of the invention, there is provided an information processing apparatus having program installing means for receiving identification information of an external processing apparatus in response to a connection of the external processing apparatus and installing a first control program corresponding to the external processing apparatus into the information processing apparatus, comprising: a discriminating unit, arranged for discriminating whether, when the first control program is installed by the program installing means, a second control program corresponding to the external processing apparatus which has already been stored in the information processing apparatus enters a mismatching state or not; and a control unit, arranged for controlling the installing operation of the information processing apparatus in accordance with a result of the discrimination of the discriminating unit.

According to another aspect of the invention, before the program installing means installs a program, the discriminating unit discriminates whether, if the first control program is installed by the program installing means, the second control program corresponding to the external processing apparatus which has already been stored in the information processing apparatus enters the mismatching state or not.

For example, the information showing the discrimination result by the discriminating unit is information showing that if it is determined by the discriminating unit that the second control program enters the mismatching state when the first control program is installed, if the first control program is installed, the second control program enters the mismatching state.

For example, the information showing the discrimination result by the discriminating unit is information showing that the second control program should be updated before the installation of the first control program by the program installing means is started. Further, if it is determined by the discriminating unit that the second control program does not enter the mismatching state when the first control program is installed, the first control program is installed by the program installing means.

According to another aspect of the invention, there is a case where the control unit controls the installing operation of the information processing apparatus in a manner such that if it is determined by the discriminating unit that the second control program does not enter the mismatching state when the first control program is installed, the program installing means is allowed to start to install the first control program into the information processing apparatus, and if it is determined by the discriminating unit that the second control program enters the mismatching state when the first control program is installed, the installation of the first control program by the program installing means is not started.

According to another aspect of the invention, even in case of using the plug and play installer, a control program can be installed so that other existing control programs can keep matching performance.

According to another aspect of the invention, there is provided an information processing apparatus having program installing means for receiving identification information of an external processing apparatus in response to a connection of the external processing apparatus and installing a first control program corresponding to the external processing apparatus into the information processing apparatus, comprising a discriminating unit, arranged for discriminating whether, when the first control program is installed, a second control program of the external processing apparatus which has already been stored in the information processing apparatus enters a mismatching state or not. Therefore, even in case of newly installing a control program by using the plug and play installer, another existing control program is not subjected to the unpurposed overwriting by the program which is installed, but the matching performance can be held.

Other features and advantages of the present invention will be apparent from the following description taken in conjunction with the accompanying drawings, in which like reference characters designate the same or similar parts throughout thereof.

DETAILED DESCRIPTION OF THE PREFERRED EMBODIMENTS

Embodiments according to the present invention will be described in detail hereinbelow with reference to the drawings.

An embodiment to which the invention is preferably applied will be described hereinbelow. A device driver as software for controlling an external processing apparatus is included in a control program. A printer driver as software for controlling a printer is included in the device driver. In the embodiment, a printer driver will be described as a preferred example of the control program. As a module construction of the printer driver, there is a construction comprising a combination of a module file which is common among a plurality of apparatus types and a module file which differs every apparatus type. In the driver with such a construction (hereinafter, such a driver is called a family driver), there is an advantage such that when inconvenience of software is corrected in association with a version-up of the driver, inconvenience which occurs because there is a cause in the common module file is corrected in common among all of the apparatus types. However, there is a problem such that in the case where a driver of a new version is installed into a system, if another apparatus type has already been installed in the system by the driver of an old version, only the common module in the module construction of the printer driver of the installed apparatus type is replaced with that of a new version, so that there is a case where inconvenience is caused due to such replacement. In the specification, "install" denotes a process for implementing a desired program into the apparatus and setting the program into a state where it can be used. Software serving as program installing means for installing the program as mentioned above is called an installer. It is, therefore, an object of an embodiment of the invention that even if another apparatus type has already been installed in the system by the driver of the old version, the module construction of the printer driver of the installed apparatus type is correctly updated, thereby preventing inconvenience from being caused by the update of the software.

Figure 1:
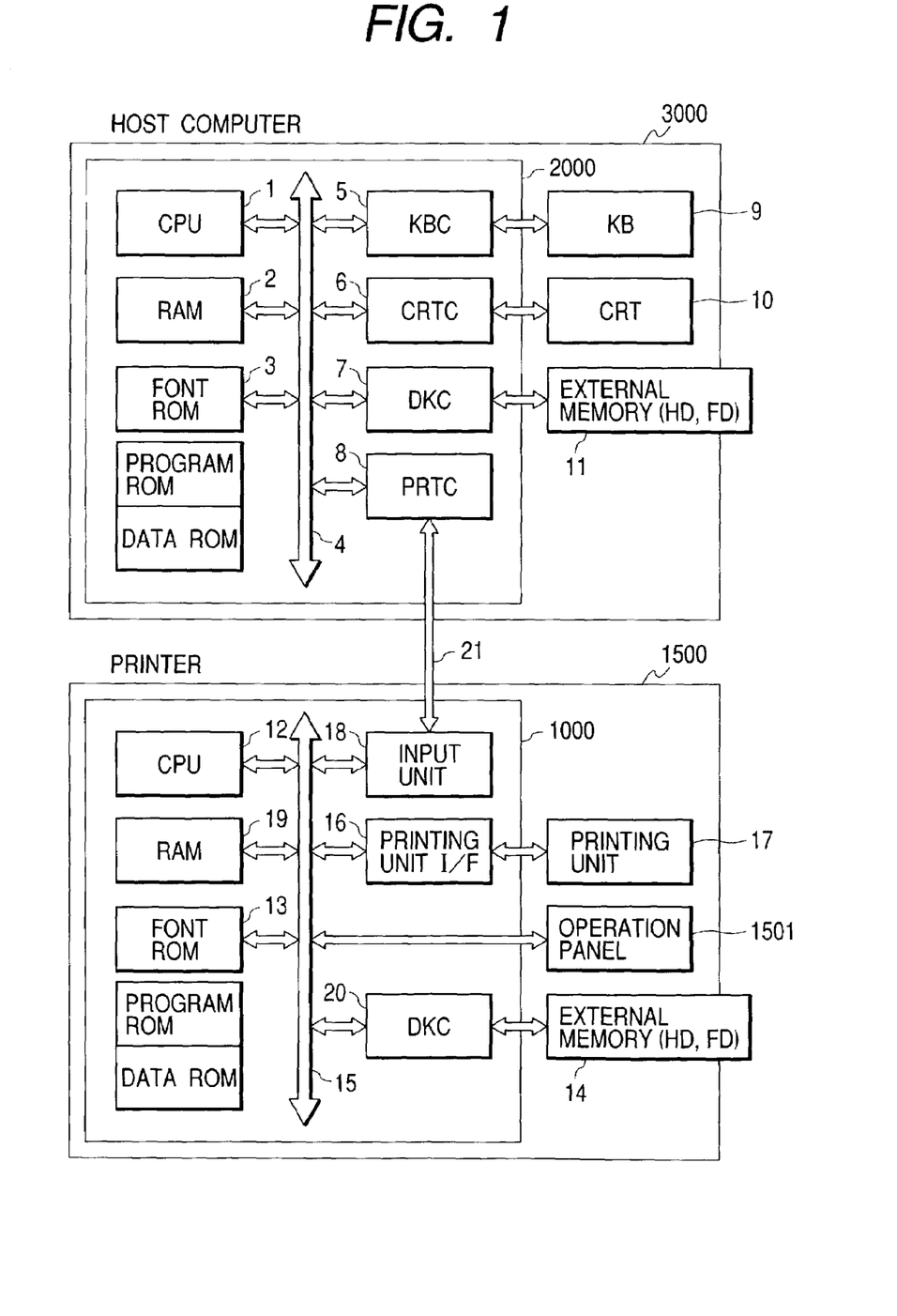
FIG. 1 is a diagram showing a construction of a printer control system showing an embodiment of an installing system of a control program according to an embodiment of the invention.

FIG. 1 is a diagram showing a construction of a printer control system showing an embodiment of an installing system of a control program according to the embodiment of the invention. Naturally, the invention can be applied to any one of a single apparatus, a system comprising a plurality of apparatuses, and a system which is connected via a network such as LAN, WAN, or the like and in which processes are executed so long as the functions of the present invention are executed unless otherwise specified. First, a system serving as a prerequisite of the embodiment will be explained and, subsequently, problems of the system serving as a prerequisite will be clarified.

In FIG. 1, reference numeral 3000 denotes a host computer as a preferred example of an information processing apparatus. The host computer 3000 has a CPU 1 for executing processes of a document in which figures, images, characters, tables (including a spreadsheet or the like), and the like exist mixedly on the basis of a document processing program or the like stored in a program ROM of a ROM 3 or an external memory 11. The CPU 1 integratedly controls each device connected to a system bus 4. An operating system program (hereinafter, abbreviated to OS) and the like for controlling the CPU 1 are stored into the program ROM of the ROM 3 or the external memory 11. Font data and the like which are used when the document process is executed are stored into a font ROM of the ROM 3 or the external memory 11. Various data which is used when the document process or the like is executed is stored into a data ROM of the ROM 3 or the external memory 11. Reference numeral 2 denotes a RAM which functions as a main memory, a work area, or the like of the CPU 1; 5 indicates a keyboard controller (KBC) for controlling a key input from a keyboard 9 or a pointing device (not shown); 6 a CRT controller (CRTC) for controlling a display on a CRT display (CRT) 10; and 7 a disk controller (DKC) for controlling an access to the external memory 11 such as hard disk (HD), floppy disk (FD), or the like for storing a boot program, various applications, font data, user files, edition files, a device driver as one of preferred examples of the control programs of the external processing apparatus, and the like. In the embodiment, the printer driver as one preferred example of the device driver will be described as an example. The printer driver in the embodiment denotes a printer control command generating program for controlling a printer 1500. Reference numeral 8 denotes a printer controller (PRTC). The PRTC 8 is connected to the printer 1500 as a preferred image forming apparatus as an example of an external processing apparatus via a predetermined bidirectional interface (interface) 21 and executes a communication control process with the printer 1500. The external processing apparatus is not limited to the printer but can be a peripheral apparatus such as scanner, digital camera, digital video camera, or the like. The image forming apparatus includes a printer, a facsimile apparatus, a copying apparatus, and a hybrid apparatus of them. The CPU 1 executes, for example, a developing (rasterizing) process of outline fonts into a display information RAM set in the RAM 2, thereby enabling WYSIWYG to be executed on the CRT 10 as display means. The CPU 1 opens various registered windows on the basis of commands instructed by a mouse cursor (not shown) or the like on the CRT 10 and executes various data processes. When the print is executed, the user opens the window regarding the setup of the print and can perform the setup of the printer or the setup of a print processing method for the printer driver including selection of a printing mode.

In the printer 1500, reference numeral 12 denotes a printer CPU. The printer CPU 12 generates an image signal as output information to a printing unit (printer engine) 17 connected to a system bus 15 on the basis of a control program stored in a program ROM of an ROM 13 or a control program stored in an external memory 14. A control program and the like for the CPU 12 are stored in the program ROM of the ROM 13. Font data and the like which are used when the output information is formed are stored in a font ROM of the ROM 13. Information which is used mainly on the host computer has been stored in a data ROM of the ROM 13 in case of a printer without the external memory 14 such as a hard disk or the like. The CPU 12 can communicate with the host computer via an input unit 18 and can notify the host computer 3000 of information or the like in the printer. Reference numeral 19 denotes a RAM which functions as a main memory, a work area, or the like of the CPU 12. The RAM 19 is constructed in a manner such that a memory capacity can be expanded by an option RAM which is connected to an expansion port (not shown). The RAM 19 is used as an output information developing area, an environmental data storing area, an NVRAM, or the like. An access to the external memory 14 such as hard disk (HD), IC card, or the like mentioned above is controlled by a memory controller (MC) 20. The external memory 14 is connected as an option and stores font data, an emulation program, form data, and the like. Reference numeral 1501 denotes an operation panel on which switches for operation, an LED display, and the like are arranged. The number of external memories mentioned above is not limited to 1 but it is also possible to construct in a manner such that at least one or more external memories are provided and a plurality of external memories in which, in addition to built-in fonts, an option font card and programs for interpreting printer control languages of different language systems have been stored can be connected. Further, it is also possible to have an NVRAM (not shown) and store printer mode setting information from the operation panel 1501.

Figure 2:
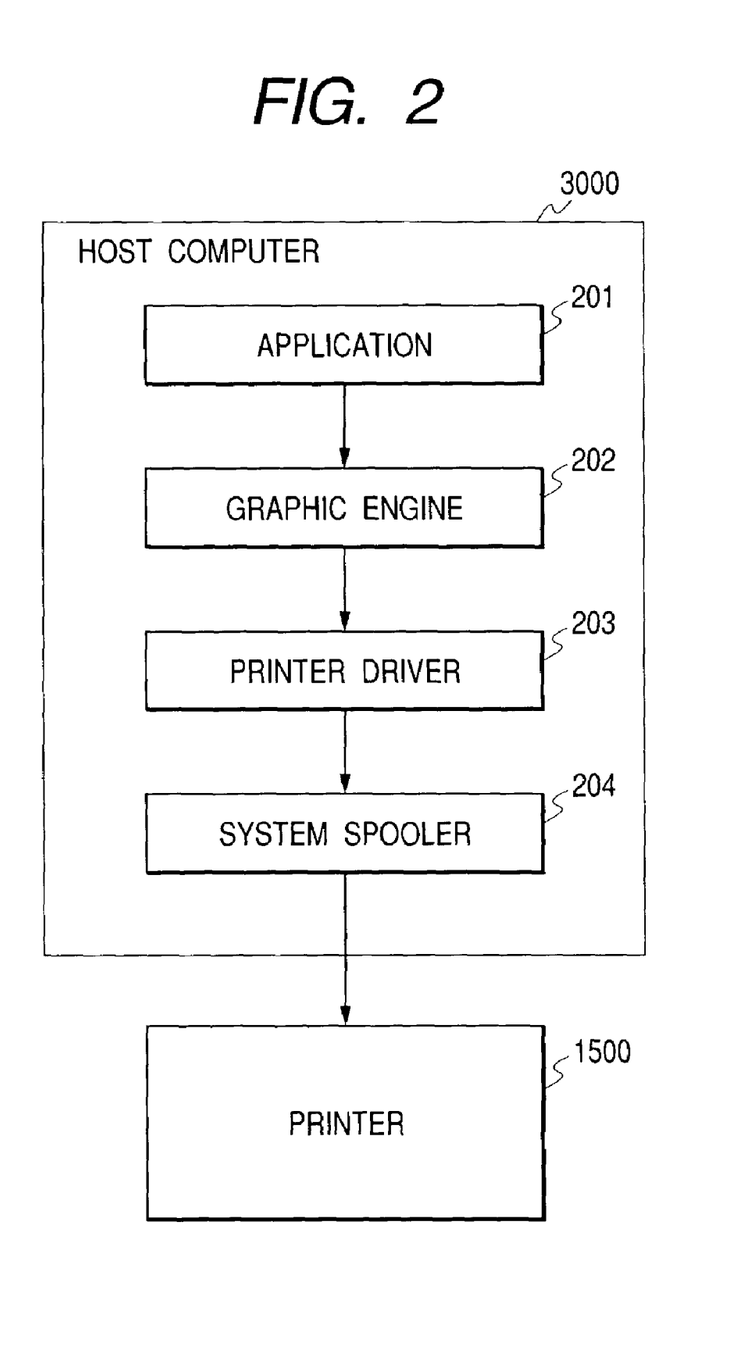
FIG. 2 is a diagram showing an example of a typical printing process in a host computer 3000 as an information processing apparatus.

FIG. 2 is a diagram showing an example of a typical printing process in the host computer 3000 as an information processing apparatus to which the printing apparatus such as a printer or the like is connected directly or connected via a network. An application 201, a graphic engine 202, a printer driver 203, and a system spooler 204 are program modules which exist as files stored in the external memory 11. When those program modules are executed, they are loaded into the RAM 2 by the OS or a module using the relevant module and executed. The application 201 and printer driver 203 can be added to an FD of the external memory 11 or a CD-ROM (not shown) or can be added to an HD of the external memory 11 via a network (not shown). Although the application 201 stored in the external memory 11 is loaded into the RAM 2 and executed, in case of instructing the printer 1500 to print from the application 201, an output (drawing) is executed by using the graphic engine 202 which has similarly been loaded into the RAM 2 and is in a state where it can be executed. The graphic engine 202 similarly loads the printer driver 203 prepared every printing apparatus from the external memory 11 into the RAM 2 and converts an output of the application 201 into a control command of the printer by using the printer driver 203. The converted printer control command is outputted to the printer 1500 via the interface 21 through the system spooler 204 loaded into the RAM 2 by the OS.

Figure 7:
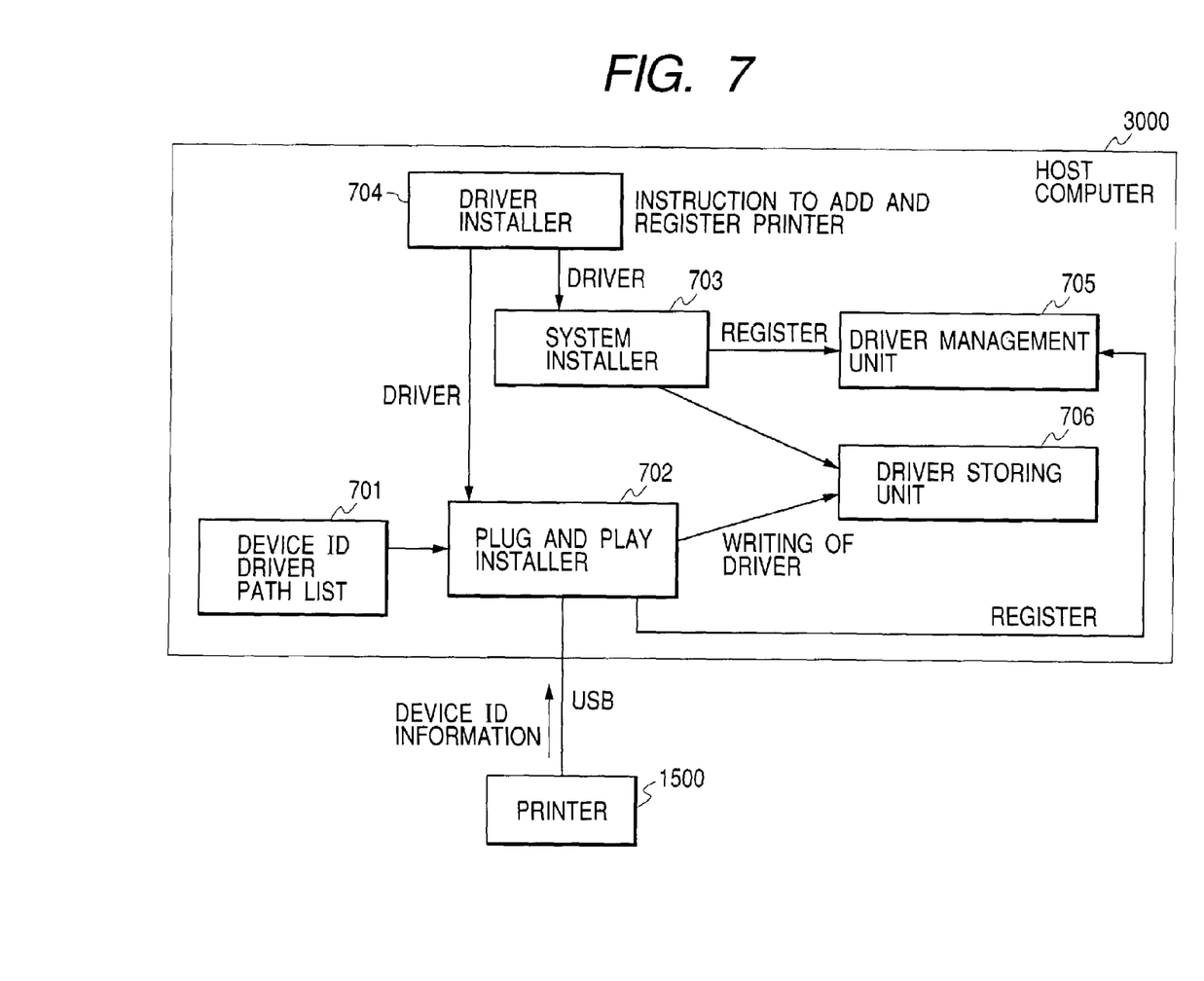
FIG. 7 is a diagram showing a software construction in the host computer 3000 in the embodiment of the invention.

FIG. 7 is a diagram showing a software construction in the host computer 3000 in the embodiment of the invention. Reference numeral 701 denotes a database comprising a set of device IDs and a driver path list. Reference numerals 702 to 706 denote program modules stored in the external memory 11 in FIG. 1 in the host computer 3000. Those program modules are read out and stored into the RAM 2 and controlled by the CPU 1 as necessary. The device ID information is information for identifying a peripheral apparatus (for example, printer 1500). The driver path list used here denotes a storing location (path) in the external memory 11 of the device driver (in the embodiment, printer driver) as a preferred example of the control program for enabling the peripheral apparatus corresponding to the specific device ID to be used. In FIG. 7, although the storing location of the driver is set to the external HDD, it can be also set to a location in a memory (not shown) in another external server apparatus connected via the network.

First, a conventional installer 703 (system installer 703) will be described. The system installer 703 used before the plug and play function in the embodiment is developed is a function which is provided by the OS. Reference numeral 704 denotes a driver installer. The driver installer 704 as a preferred example of control means for controlling the host computer in the embodiment is an application and is a module having a function for instructing the system installer 703 to assemble (install) the device driver into a driver storing unit 706 from the external memory 11 or another server apparatus (not shown) on the basis of an instruction to select the device driver or the like by the user. When the system installer notifies the system installer 703 of the storing location of the device driver and instructs the installation, the system installer 703 installs the device driver into the driver storing unit 706 and registers the external processing apparatus which uses the device driver into a driver management unit 705. The driver management unit 705 is also called a registry and is a location in the OS for registering the information of the external processing apparatus so as to allow the OS to recognize the external processing apparatus. Specifically speaking, in case of installing the device driver via the system installer 703, the user can instruct in detail the system installer 703 to add and update a device driver via the driver installer 704, and register the device driver into a driver registering unit as a function of the OS, and the like. By the registration of the printer into the driver registering unit as a preferred example of the external processing apparatus registering unit, the device driver stored in the driver management unit 706 and the printer which uses this device driver are registered into the OS. The driver storing unit 706 is a part of the external memory 11 in which the device driver corresponding to the external processing apparatus which the user wants to enable it to be used with is installed.

Subsequently, a plug and play installer 702 as program installing means corresponding to the plug and play will be described. The plug and play installer 702 receives device ID information (as a preferred example of the identification information of the apparatus) from the printer 1500 in response to that the printer 1500 (as a preferred example of the external processing apparatus) has been connected via a USB, and specifies the storing location of the printer driver corresponding to the device ID information received from the device ID driver path list 701. The printer driver to be newly installed or updated is a preferred example of a first control program. In the embodiment, although the USB has been used as an example of a method of transmitting and receiving the identification information of the apparatus, the device ID information serving as identification information of the external processing apparatus can be also transmitted and received in an upper layer in a format of a message including extensible Markup Language (XML) or the like as a structured language or the like. Subsequently, the plug and play installer installs the printer driver stored in a server (not shown) out of the apparatus as a preferred example of the first control program or in the external memory 14 which the host computer 3000 has in the driver storing unit 706. At the same time, the plug and play installer automatically registers the printer into the driver management unit on the basis of the device ID information. Since the conventional system installer 703 can receive a selecting instruction of the printer driver to be added or updated by the user via the upper driver installer 704, in order to hold the matching performance of the printer driver in the system, on the way of newly installing a printer driver, the user can select and update other printer drivers to be updated. However, the plug and play installer 702 is not activated via the input of the user but automatically selects the printer driver to be updated or added as an example of the first control program on the basis of the received device ID. Since the plug and play installer 702 does not provide means for allowing the user to select and instruct the driver to be added or updated before the printer driver is newly installed, the following problems occur. That is, there occurs a problem such that at the time of adding or updating the printer driver, the user cannot previously know what kind of change is performed to the existing printer driver having the common module. Even if the user does not demand the change of the common module of the existing printer driver, the printer driver having the existing common module is overwritten against the intention of the user. The plug and play installer 702 has a problem such that since the driver to be installed is unconditionally selected on the basis of the received device ID, unlike the conventional system installer 703, detailed instructions for the addition or update of the existing printer driver, the registration of the printer into the driver management unit 705, and the like cannot be performed via the driver installer 704. Specifically speaking, there is a problem such that no consideration is made with respect to a problem such that if a printer A is connected to a computer in which a printer driver of another apparatus type has already been installed, a printer driver of the printer A is automatically or semiautomatically written into the driver storing unit 706, so that a common module or the like of another printer driver is overwritten, or the like. It is, therefore, an object of the embodiment of the invention to provide a mechanism such that even in case of performing the installation using the plug and play installer 702, the printer driver can be updated or added while keeping the matching performance of the printer driver. Subsequently, a method of accomplishing the above objects will be described in detail with reference to FIGS. 3A and 3B and subsequent drawings.

Figure 3A:
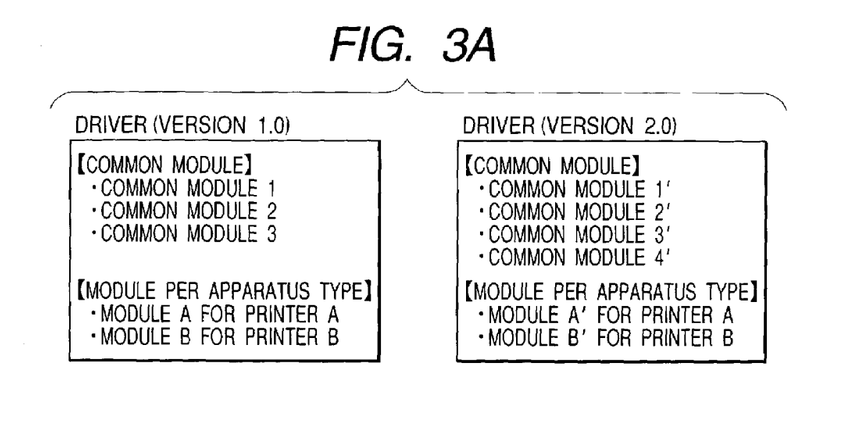
FIG. 3A is a diagram showing contents of modules constructing drivers.
Figure 3B:
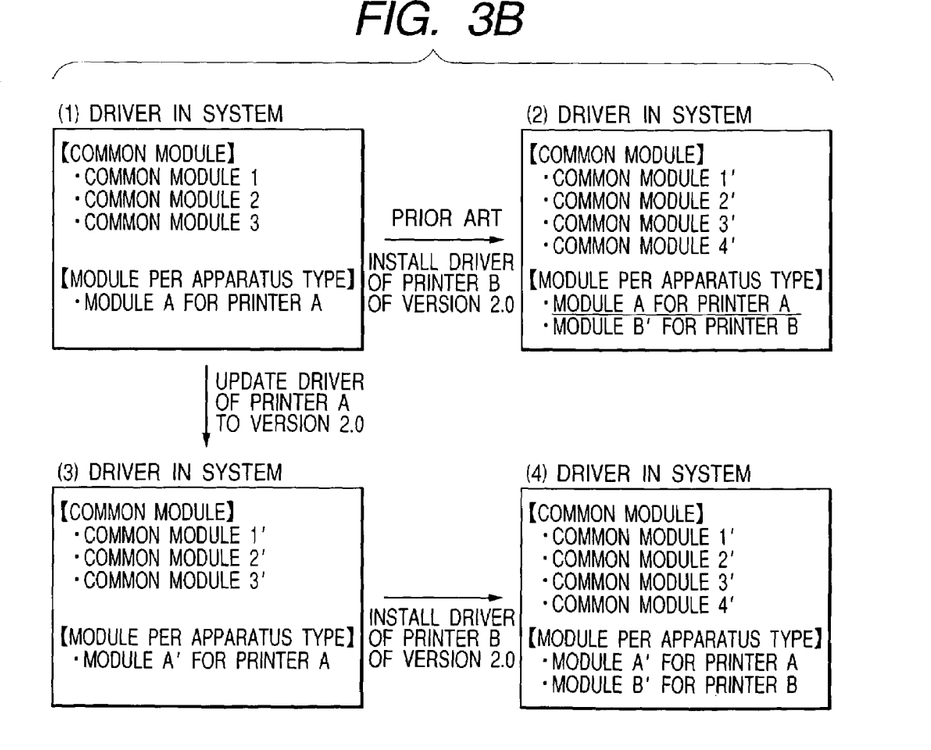
FIG. 3B is a flowchart showing processes which are executed in case of newly installing drivers.

FIG. 3A is a diagram showing contents of modules constructing drivers. FIG. 3B is a flowchart showing processes which are executed in case of newly installing drivers. A constructional diagram of a printer driver (version 1.0) and a printer driver (version 2.0) is shown in FIG. 3A. The printer drivers shown in the diagrams support the printers A and B. In version 1.0, the printer driver for the printer A comprises common modules 1 to 3 and a module A as a module per apparatus type, and the printer driver for the printer B comprises common modules 1 to 3 and a module B as a module per apparatus type. In version 2.0, all of the modules of version 1.0 are updated (in order to show that they were updated, "'" (dash mark) is added to each module number). With respect to the modules which are common to both printers, one common module 4 is added.

As shown in (1) in FIG. 3B, a state where the driver corresponding to the printer A has been installed in the host computer 3000 is now considered. If the printer B is added by the conventional plug and play installer, the drivers in the system enter a state of (2) in FIG. 3B. That is, the printer driver of version 2.0 of the printer B comprises common modules 1' to 3', the common module 4, and a module B' for the printer B as mentioned above. Therefore, if the printer driver of the printer B is added, the module A for the printer A is held in version 1.0 in spite of the fact that the common modules 1' to 3' for the printer A are overwritten as version 2.0. Therefore, there is a problem such that the versions of the common modules do not coincide, the printer driver A is in the mismatching state, and there is a possibility of occurrence of inconvenience in the operation. In the conventional installer which does not cope with the plug and play, although the driver modules are managed by the version numbers here, naturally, as other version information, it is possible to manage the program by an identifier such as symbol, character train, or the like which can be identified, other than numerals. As a mismatching state of the control program, for example, there is a state where since the common modules of the printer driver corresponding to one apparatus type and the interface prepared in the module per apparatus type of each driver are different, a mismatching state occurs, or there is a mismatching state of data per apparatus type or the like which may be prepared for the module per apparatus type of each driver and for the common modules. In the embodiment, as a preferred example, whether the mismatching state occurs or not is discriminated by the version information of the module per apparatus type. However, such a discrimination can be also made by preparing a program for calling functions among the modules, a checking program of the interface, or the like. In the embodiment, as a preferred example, the system is designed so that the existing drivers are updated to the latest printer drivers for as many as possible. As another embodiment, for example, it is also possible to use a mechanism such that the existing drivers of the versions in the specific range are updated to the printer drivers of the version to be installed at present. It is not always necessary to update the existing printer drivers to the latest printer drivers.

Figure 4:
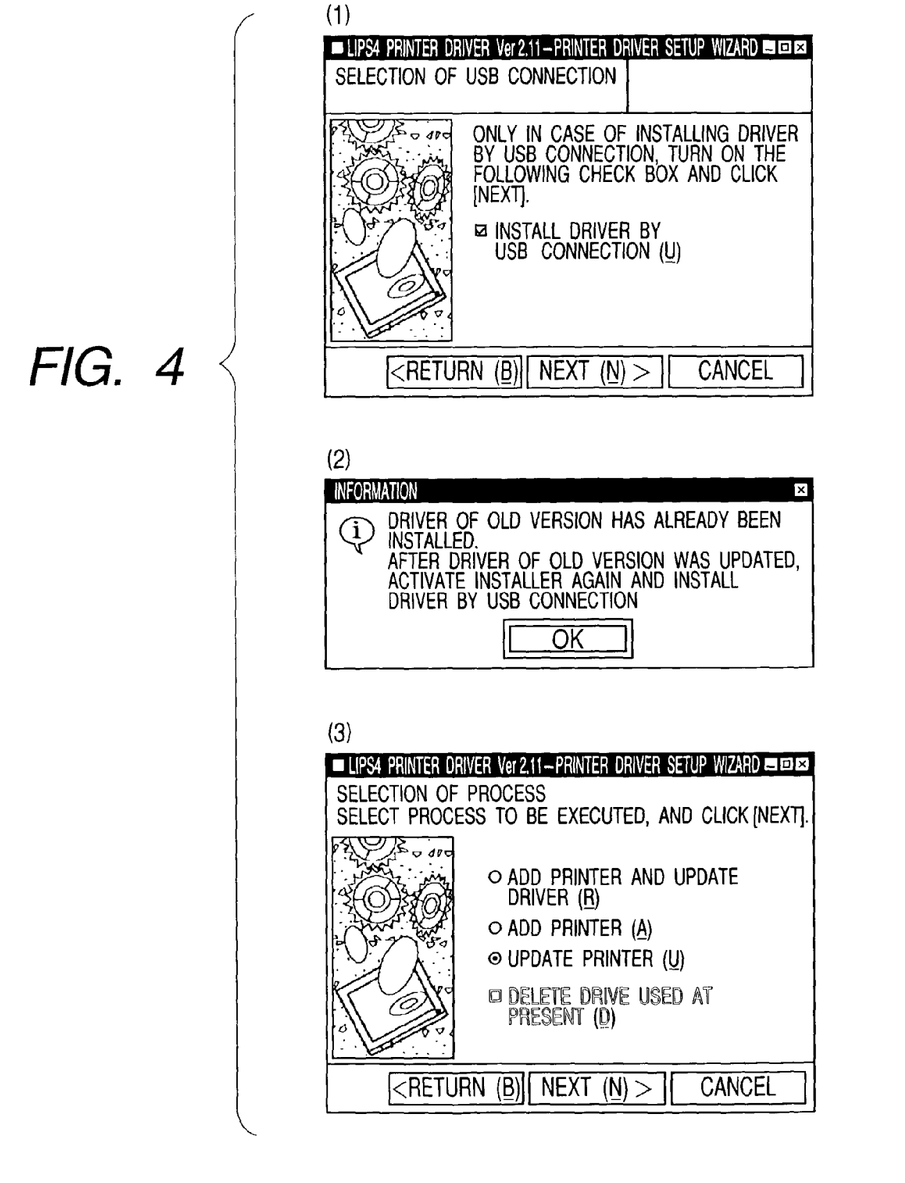
FIG. 4 is a diagram showing an installing process of a printer driver which is displayed when a driver installer 704 in the embodiment is activated and an example of a user interface for selecting the installing process.

FIG. 4 shows an installing method of printer drivers which are displayed when the driver installer 704 in the embodiment is activated. That is, FIG. 4 shows an example of a user interface (UI) for selecting the installing method. An example of a method of solving the problems in the plug and play installer will now be described hereinbelow with reference to FIGS. 3A, 3B, and 4.

The installation of the control program denotes that the printer driver as a preferred example of the control program of the external control apparatus which has previously been downloaded into the self apparatus is implemented in a state where the system in the self apparatus can use it. For example, such installation includes a state where the driver has been implemented in the driver storing unit 706 as a state where it can be loaded by the OS installed in the host computer 3000. Naturally, network installation such that the host computer downloads and implements the printer driver held in the external server apparatus (not shown) is also one preferred example of the installation.

For example, it is now assumed that the drivers in the system of the host computer 3000 are in the state shown in (1) in FIG. 3B. First, the user activates the printer driver installer and checks "Install driver by USB connection" in order to install the printer driver by the plug and play function ((1) in FIG. 4). After that, a "NEXT" button is pressed. Although an explanation will be made in detail hereinlater with reference to FIGS. 5 and 6, a discriminating process (S510 and S511 in FIG. 5 or S610 or S611 in FIG. 6) for discriminating whether the printer driver for controlling the printer A which has already been stored in the host computer enters the mismatching state when the printer driver for controlling the printer B is installed or not is executed. Before the installation of the printer driver of the printer B by the plug and play installer 702 is started, the driver installer notifies the host computer of a result of the discriminating process. Specifically speaking, the installed printer drivers in the system are searched. If the version of the installed printer driver is old, a message showing that the installation by the plug and play is performed only after the existing printer driver was updated is displayed on the CRT 10 of the host computer ((2) in FIG. 4). The processing routine advances to a procedure for updating the driver ((3) in FIG. 4). The "notification" indicates the operation such that such a message is formed via the driver installer 704 by using a dialog box by using the function of the OS and displayed to the host computer. In the case where the driver installer 704 is remotely operated via the network, or the like, it is also possible to form E-mail including the foregoing message and transmit it to an external apparatus (not shown) or to notify the external apparatus of the foregoing message by using a voice sound.

A preferred example of the program updating means is shown in (3) in FIG. 4. Although the program updating means can be constructed as a part of the driver installer 704, it can be also assembled as a part of the OS. In (3) in FIG. 4, the user selects "Update driver" in order to update the existing drivers and keep the matching performance of the existing printer driver. As shown in (3) in FIG. 3B, among the drivers in the system, the driver installer 704 updates the printer driver such that if the printer driver to be newly installed is installed, the existing printer driver is overwritten and the matching performance cannot be obtained. Further, the apparatus is activated again as necessary and the updated printer driver is implemented into the OS. At this time, it is preferable to construct the system in a manner such that if the instruction of the user, the activating state of the apparatus, or the device ID information which is received from the USB interface is recognized, and the driver installer 704 is automatically made operative. When the driver installer is activated, a picture plane of (1) in FIG. 4 appears. By pressing the "NEXT" button in the state of the picture plane of (1) in FIG. 4, the discriminating process for discriminating whether the printer driver for controlling the printer A which has already been stored in the host computer disclosed in FIGS. 5 or 6 enters the mismatching state or not is made in a manner similar to that mentioned above. However, with respect to the printer A, a fact that it has already been checked is detected and it is determined that the existing printer driver module does not enter the mismatching state even if the printer driver of the printer B is installed, thereby permitting the activation of the plug and play installer. The plug and play installer automatically reads out the device ID driver path list 701 or designates the device ID driver path list 701 and reads it out, thereby detecting the driver path corresponding to the printer A. The plug and play installer automatically obtains the printer drivers arranged on the driver path corresponding to the printer A, stores the printer drivers into the driver storing unit 706, and registers the printer A into the driver management unit 705. At this time, the drivers in the system of the host computer 3000 are in a state of (4) in FIG. 3B. With respect to both of the printers A and B, their versions are equal to 2.0, the printer drivers are normally installed, and they are in a state where the matching performance of each printer driver is obtained.

In the foregoing embodiment, after the driver installer was activated, in (2) in FIG. 4, whether the installation by the plug and play is executed or not is discriminated by an instruction showing whether a check box of the USB connection has been marked or not, that is, by an instruction showing whether the plug and play installation is executed by using the plug and play installer or not. However, more preferably, it is also possible to construct the system in a manner such that by providing a program for monitoring, for example, the USB interface, the execution of the plug and play installation is detected before the plug and play installer is activated, and the discriminating process for discriminating what kind of mismatching can occur if the printer driver corresponding to the received device ID is installed is executed. As mentioned above, the driver installer 704 as a preferred example of the control means discriminates whether the printer driver corresponding to the printer which has already been installed and which has already been stored in the host computer 3000 enters the mismatching state in the case where the new printer driver is installed by the plug and play installer 702 or not. The installing operation of the host computer 3000 can be controlled in accordance with a result of the discrimination. As an example of a method of controlling the installing operation of the apparatus, there is a method whereby the driver installer 704 controls the CRT 10 as a preferred example of the display unit of the host computer 3000 in accordance with the discrimination result, thereby displaying a dialog box or controlling the installing operation of the plug and play installer 702. The method also includes a method whereby, for example, in order to transmit and receive the discrimination result in accordance with the discrimination result, the driver installer 704 indirectly controls a communication interface (input unit 18) as one function of the host computer 3000 such as LAN, Centronics, or the like of the host computer via the OS or the like, thereby allowing the host computer 3000 to communicate with another computer or the like (not shown), or the like.

Although the embodiment has been described with respect to the example in which the number of existing printer drivers is not equal to a plural number, for example, if there are a plurality of existing printer drivers, it is also possible to construct the system in a manner such that an "Update all" mode is provided for the driver installer, the discrimination about the version of the printer driver corresponding to each of the existing printers and the discrimination about the matching performance of the program in association with the installation are executed first, after that, the existing printer drivers to be updated are specified, and a process for updating them in the lump in accordance with an instruction of the user or automatically is executed. According to the embodiment, since whether the printer drivers enter the mismatching state or not is managed by using the version information of the common module and the version information of the modules per apparatus type, merely by comparing the version information of each module, whether the printer drivers enter the mismatching state due to the installation of the printer driver or not can be easily discriminated. Flowcharts for those processes will be described in detail hereinlater with reference to FIGS. 5 and 6.

Figure 5:
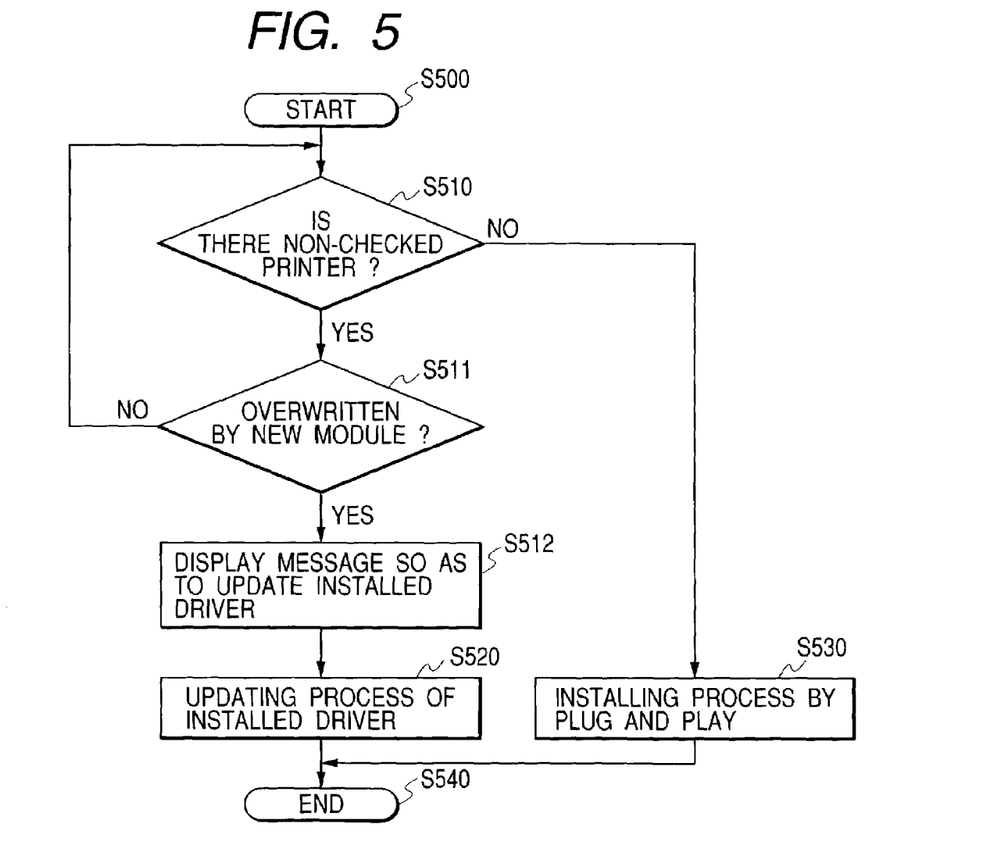
FIG. 5 is a diagram for explaining main processes of a driver installer in one embodiment.

FIG. 5 is a diagram for explaining main processes of the driver installer in an example of the embodiment and is a flowchart showing processes such that, in the embodiment, upon driver installation by the plug and play, in order to prevent only a part of the modules of the installed printer drivers from being updated, the installation by the plug and play is executed only after the installed printer drivers were updated.

The embodiment will be described in detail hereinbelow mainly with reference to the flowchart shown in FIG. 5.

The processes in the embodiment are started by a method whereby the installation of the driver by the plug and play is selected by the user by the keyboard controller KBC 5 or the like shown in FIG. 1, so that the driver installer 704 is activated or a method whereby the device connected to the USB interface is recognized, so that the driver installer 704 is automatically activated (S500).

First, by processes in steps S510 and S511, the driver installer 704 discriminates whether the updating process of the installed driver is necessary or not. The driver installer 704 discriminates whether the discrimination about all of the installed printers has been finished or not (S510). If the discrimination is not finished yet, the driver installer 704 executes the process in S511. If the discrimination has been finished, it is determined that there is no need to update the printer driver of the printer in which the update of the driver is necessary. In S530, the plug and play installer is activated and the plug and play installing process is executed. In S511, the driver installer 704 discriminates whether the common module of the existing printer drivers corresponding to the non-checked printers in which the discrimination about the necessity of the update of the driver and which were detected in S510 is not made yet is overwritten or not if it is assumed that the plug and play installer 702 has installed the printer driver to be newly installed. Specifically speaking, the driver installer 704 checks a file construction of the printer driver of the printer which has already been installed. If there is a module name common to that of the printer driver to be newly installed, their versions are compared. If the version of the installed printer driver is older than that of the printer driver to be newly installed, it is determined that the module is overwritten by the new version. Subsequently, the driver installer 704 executes a process in S512. In other cases, in order to check the next installed printer, the driver installer 704 executes the process in S510 again. In S512, the driver installer 704 displays the message showing that the new printer driver can be installed by the plug and play only after the installed printer driver was updated to the printer driver of the new version. After that, the updating process of the driver by the driver installer 704 without intervening the plug and play installer is executed (S520). The processing routine is finished.

By the processes as mentioned above, when the driver is installed by the plug and play, since the printer driver which has already been installed is the driver of the latest version, the problem which occurs because only the common module of the installed printer drivers is updated by being overwritten can be avoided.

If it is necessary to update the printer driver, the user is urged to update it. If the update is unnecessary, by permitting the installation, the user operation is assisted and the matching performance of the drivers can be held.

If it is possible to obtain information for managing common module information in which a dependence relation has previously been arranged, the module management information can be used. Therefore, a possibility that if the printer driver to be newly added is installed, the common module information is overwritten and the matching performance cannot be obtained can be easily discriminated.

Further, if the driver installer 704 is enabled to be activated in response to the connection of an external processing apparatus, it is possible to connect the external processing apparatus and execute the plug and play irrespective of the connection timing of the external processing apparatus.

Figure 6:
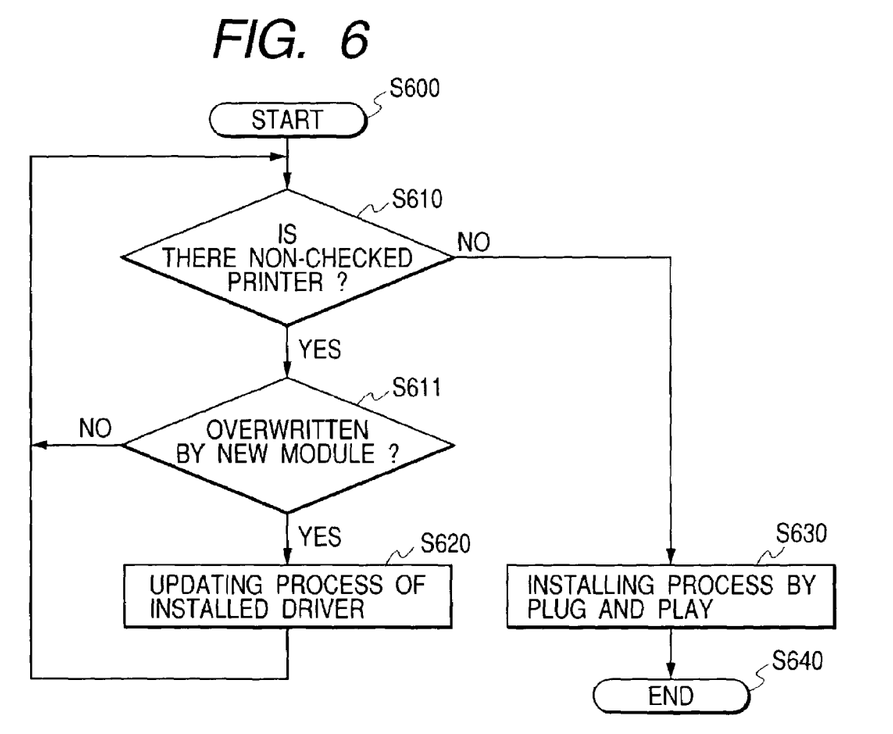
FIG. 6 is a diagram for explaining main processes of the driver installer in one embodiment.

In the embodiment, FIG. 6 is a diagram for explaining main processes of the driver installer in the foregoing embodiment. FIG. 6 is a flowchart showing processes constructed in a manner such that in order to prevent only a part of the modules of the installed printer drivers from being updated when the driver is installed by the plug and play installer 702, the installed printer drivers are detected and updated and, thereafter, the installation by the plug and play is executed in the lump.

A difference between the embodiment and the foregoing embodiment is shown below and the embodiment will be described in detail mainly with respect to the flowchart shown in FIG. 6.

Processes in the embodiment are started by a method whereby the user selects the installation of the driver using the plug and play installer 702 by the keyboard controller KBC 5 or the like shown in FIG. 1, thereby activating the driver installer 704 or by a method whereby the driver installer 704 is automatically activated by recognizing the device connected to the USB interface (S600). The instruction to select the execution of the installation using the plug and play installer 702 mentioned above can be also performed by a method whereby, for example, the check box to install the driver by the USB connection shown in (1) in FIG. 4 is marked by an input from the keyboard controller KBC 5 or a mouse (not shown) connected to the host computer 3000. First, the driver installer 704 discriminates whether there is a non-checked existing printer or not in S610. The driver installer 704 executes the following process in S611 to the printer which was detected in S610 and in which the update of the driver is necessary. Such a printer can be detected by using the device ID information of the USB or by using the printer information registered in the driver management unit 705. Subsequently, the driver installer 704 discriminates in S611 whether the printer driver which has already been stored in the host computer 3000 enters the mismatching state when the new printer driver is installed from the outside or not. Specifically speaking, in S611, the driver installer 704 discriminates whether the existing printer driver is overwritten by the new module of the printer driver to be installed and enters a mismatching state of the version information of the common module of the existing printer driver and the module per apparatus type or not, that is, whether the printer drivers enter the mismatching state or not. For example, the driver installer 704 examines the name of the common module which the printer driver of the printer in which the update of the driver is necessary has and examines the name of the common module which the printer driver to be installed at present has. If there is a common module which is newer than the version of the printer driver which the existing printer has, the driver installer 704 determines that the common module of the printer in which the update of the driver is necessary is overwritten and the printer drivers enter the mismatching state, and determines that it is necessary to execute the updating process of the installed driver corresponding to the printer in which the discrimination about the necessity of the update of the driver is not made yet. If it is determined in S611 that the common module of the printer driver of the printer in which the discrimination about the necessity of the update of the driver is not made yet is overwritten by the new module, the driver installer 704 executes the updating process of the driver of the printer in which the update of the driver is necessary in S620. At this time, it is preferable to construct the system in a manner such that a picture plane shown in (2) in FIG. 4 is displayed and when an OK button is pressed, as shown in (3) in FIG. 4, before the installation of a new program is started, a driver picture plane to notify the host computer of a message showing that the existing printer drivers which were determined that the common module is overwritten by installing the printer driver to be newly added in the host computer 3000 should be updated is displayed on the CRT 10 of the host computer 3000 so as to prevent a situation such that the common module of the existing printer drivers is overwritten and the printer drivers enter the mismatching state. After that, the printer drivers in which the update of the existing drivers is necessary are updated by the system installer 703. The processing routine is returned to S610 and the driver installer 704 discriminates the presence or absence of the printer in which the update of the non-checked driver is necessary. In S610, if the discrimination about the necessity of the update of the printer driver is finished with respect to all printers, the plug and play installer 702 installs the new printer driver corresponding to the detected printer by the plug and play (S630). The installing process is finished.

By the processes as mentioned above, upon driver installation by the plug and play, since the printer drivers which have already been installed are the drivers of the latest version, the problem which occurs because the common module of the installed printer drivers is updated by being overwritten can be avoided.

Further, after the operation to update the module was once executed, the user can be again urged to execute the process for installing the printer driver of the printer to be newly added. For example, it is possible to prevent a change to the control program having a possibility that a trouble which the user does not intend is caused, for example, a trouble such that the printer does not operate or inconvenience of the print system is caused. In case of updating the printer drivers including the common module, since the common module management information showing the dependence relation of the modules can be used, when the printer driver is newly added and updated, whether the matching performance can be obtained or not can be easily and preliminarily checked. If necessary, after the existing printer drivers were updated, the target printer driver can be installed by the plug and play.

There is an effect such that by first specifying the printer drivers which need to be updated and updating those printer drivers in the lump, the number of instructions to the installer is small and the operation of the user upon update of the printer drivers can be simplified.

The invention can be applied to a system comprising a plurality of apparatuses (for example, a host computer, an interface apparatus, a reader, a printer, and the like) or can be also applied to an apparatus comprising one equipment (a copying apparatus, a printer, a facsimile apparatus, or the like). The object of the invention can be also accomplished by a method whereby a recording medium in which program codes of software for realizing the functions of the embodiments mentioned above have been stored is supplied to a system or an apparatus, and a computer (or a CPU or an MPU) of the system or apparatus reads out the program codes stored in the recording medium and executes them.

In this case, the program codes themselves read out from the memory medium realize the functions of the embodiments mentioned above and the memory medium in which the program codes have been stored constructs the invention.

As a memory medium for supplying the program codes, for example, a floppy disk, a hard disk, an optical disk, a magnetooptic disk, a CD-ROM, a CD-R, a magnetic tape, a non-volatile memory card, a ROM, or the like can be used.

The invention incorporates not only a case where a computer executes the read-out program codes, so that the functions of the embodiments mentioned above are realized but also a case where an OS (Operating System) or the like which operates on the computer executes a part or all of actual processes on the basis of instructions of the program codes, and the functions of the embodiments mentioned above are realized by those processes. Although the OS has been mentioned as a preferred example of the software for managing the system, system software other than the OS can be also used. Even in the case where the program installing means is included in the system software, a program including the function of the driver installer which accomplishes the object of the invention is naturally incorporated in the purview of the invention. It is effective that the discriminating process about whether the existing printer drivers are mismatched due to the new installation or update-installation or not is executed before the installation. However, for example, it is also possible to construct the system in a manner such that the existing drivers in the host computer are retreated or the like, the driver is newly installed or updated and installed, and subsequently, the above discriminating process is executed, and whether the existing drivers are returned to the original locations in accordance with the result of the discriminating process or not is determined.

Further, the invention also incorporates a case where the program codes read out from the memory medium are written into a memory equipped for a function expanding board inserted into a computer or a function expanding unit connected to a computer, and thereafter, a CPU or the like equipped for the function expanding board or the function expanding unit executes a part or all of the actual processes on the basis of instructions of the program codes, and the functions of the embodiments mentioned above are realized by those processes.

As described above, according to the embodiments of the invention, upon installation by the plug and play, all of the module files of the installed printer drivers have already been updated by the new module file and a situation such that only a part of the module files is rewritten to the file of the new version can be avoided. A situation such that since the printer driver is newly installed, the existing printer drivers are mismatched, so that the operation of the installed printer driver becomes improper can be avoided.

As described above, according to one aspect of the invention, even in case of using the plug and play installer, the control program can be installed so that other existing control programs can keep the matching performance. According to another aspect of the invention, there is provided the information processing apparatus having program installing means for receiving identification information of the external processing apparatus in response to the connection of the external processing apparatus and installing the first control program corresponding to the external processing apparatus into the information processing apparatus. The apparatus includes the discriminating unit, arranged for discriminating whether, when the first control program is installed, the second control program of the external processing apparatus which has already been stored in the information processing apparatus enters a mismatching state or not. Therefore, even in case of newly installing a control program by using the plug and play installer, another existing control program is not subjected to the unpurposed overwriting by the program which is installed, but the matching performance can be held.

The invention claimed is:

1. An information processing apparatus having program installing means for receiving identification information of a first external processing apparatus in response to a connection of the first external processing apparatus and installing a first control program corresponding to the first external processing apparatus into said information processing apparatus, comprising:
   a discriminating unit, arranged for discriminating whether or not, when the first control program is installed by the program installing means, a second control program corresponding to a second external processing apparatus which has already been stored in said information processing apparatus becomes inconsistent; and
   a control unit, arranged for controlling the program installing means to start installing the first control program into said information processing apparatus if said discriminating unit discriminates that the second control program does not become inconsistent when the first control program is installed, and for updating the second control program to avoid becoming inconsistent and then controlling said program installing means to install the first control program into said information processing apparatus if said discriminating unit discriminates that the second control program becomes inconsistent when the first control program is installed.

2. An apparatus according to claim 1, wherein before the program installing means installs a program, said discriminating unit discriminates whether, if the first control program is installed by the program installing means, the second control program corresponding to the second external processing apparatus which has already been stored in said information processing apparatus becomes inconsistent.

3. An apparatus according to claim 1, wherein said control unit controls the installing operation of said information processing apparatus to indicate information indicative of the discrimination result by said discriminating unit.

4. An apparatus according to claim 3, wherein the information indicative of the discrimination result by said discriminating unit is information indicating that if it is determined by said discriminating unit that the second control program becomes inconsistent when the first control program is installed, if the first control program is installed, the second control program becomes inconsistent.

5. An apparatus according to claim 3, wherein the information indicative of the discrimination result by said discriminating unit is information indicating that the second control program should be updated before the installation of the first control program by the program installing means is started, and further,
   if it is determined by said discriminating unit that the second control program does not become inconsistent when the first control program is installed, the first control program is installed by the program installing means.

6. An apparatus according to claim 1, wherein said control unit controls the installing operation of said information processing apparatus in a manner such that if it is determined by said discriminating unit that the second control program does not become inconsistent when the first control program is installed, the program installing means is allowed to start to install the first control program into said information processing apparatus, and if it is determined by said discriminating unit that the second control program becomes inconsistent when the first control program is installed, the installation of the first control program by the program installing means is not started.

7. An apparatus according to claim 1, wherein:
   the second control program becomes inconsistent when a part of the second control program which has already been installed is overwritten in response to the installation of the first control program; and
   said control unit discriminates whether a part of the second control program is overwritten or not by comparing information identifying the version of the first control program with information identifying the version of the second control program.

8. An apparatus according to claim 1, wherein said control unit discriminates whether module information which is shared by the first and second control programs is overwritten by installing the first control program or not, and if the shared module is overwritten, said discriminating unit determines the second control program becomes inconsistent.

9. An apparatus according to claim 1, wherein said information processing apparatus further has a program updating unit, and if it is determined by said control unit that the second control program becomes inconsistent when the first control program is installed, said control unit controls said apparatus so as to execute an updating process of the second control program by said program updating unit as a process different from the installation of the first control program by the program installing means.

10. An apparatus according to claim 1, wherein in said control unit, said information processing apparatus detects a plurality of control programs in which if the first control program is installed, control programs stored in said information processing apparatus become inconsistent, and said information processing apparatus updates in the lump the plurality of detected control programs stored in said information processing apparatus.

11. An apparatus according to claim 1, wherein said control unit operates in response to the connection of the first external processing apparatus and discriminates whether the second control program of the second external processing apparatus which has already been stored in said information processing apparatus becomes inconsistent when the first control program is installed or not by using the identification information of the first external processing apparatus received from the first external processing apparatus.

12. An apparatus according to claim 11, wherein the identification information of the first external processing apparatus is received in response to the first external processing apparatus being connected to said information processing apparatus via a network.

13. A computer-executable control program, embodied in a computer-readable medium, which is executed in an information processing apparatus having program installing means for receiving identification information of a first external processing apparatus in response to a connection of the first external processing apparatus and installing a first control program corresponding to the first external processing apparatus into the information processing apparatus, wherein said control program can execute:
a discriminating step of discriminating whether or not, when the first control program is installed by the program installing means, a second control program corresponding to a second external processing apparatus which has already been stored in the information processing apparatus becomes inconsistent; and
a control step of controlling the program installing means to start installing the first control program into the information processing apparatus if said discriminating step discriminates that the second control program does not become inconsistent when the first control program is installed, and for updating the second control program to avoid becoming inconsistent and then controlling the program installing means to install the first control program into the information processing apparatus if said discriminating step discriminates that the second control program becomes inconsistent when the first control program is installed.

14. A program according to claim 13, wherein before the installation of the first control program is started by the program installing means, said discriminating step discriminates whether, if the first control program is installed by the program installing means, the second control program corresponding to the second external processing apparatus which has already been stored in the information processing apparatus becomes inconsistent.

15. A program according to claim 13, wherein in said control step, the installing operation of the information processing apparatus is controlled to indicate information indicative of the discrimination result by said discriminating step.

16. A program according to claim 15, wherein the information indicative of the discrimination result by said discriminating step is information indicating that if it is determined by said discriminating step that the second control program becomes inconsistent when the first control program is installed, if the first control program is installed, the second control program becomes inconsistent.

17. A program according to claim 15, wherein the information indicative of the discrimination result by said discriminating step is information indicating that the second control program should be updated before the installation of the first control program by the program installing means is started, and further,
if it is determined by said discriminating step that the second control program does not become inconsistent when the first control program is installed, the first control program is installed by the program installing means.

18. A program according to claim 13, wherein the information processing apparatus is allowed to execute said control step of controlling the installing operation of the information processing apparatus in a manner such that:
in said control step, if it is determined by said discriminating step that the second control program does not become inconsistent when the first control program is installed, the installation of the first control program by the program installing means is started; and
in said discriminating step, if it is determined that the second control program becomes inconsistent when the first control program is installed, the installation of the first control program by the program installing means is not started.

19. A program according to claim 13, wherein:
the second control program becomes inconsistent when a part of the second control program which has already been installed is overwritten in response to the installation of the first control program; and
in said discriminating step, whether a part of the second control program is overwritten or not is discriminated by comparing information identifying the version of the first control program with information identifying the version of the second control program.

20. A program according to claim 13, wherein in said discriminating step, whether module information which is shared by the first and second control programs is overwritten by installing the first control program or not is discriminated, and if said shared module is overwritten, said discriminating step determines that the second control program becomes inconsistent.

21. A program according to claim 13, wherein:
the information processing apparatus further has a program updating unit; and
if it is determined by said discriminating step that the second control program becomes inconsistent when the first control program is installed, in said control step, the information processing apparatus is allowed to execute an updating process of the second control program by the program updating unit as a process different from the installation of the first control program by the program installing means.

22. A program according to claim 13, wherein:
in said discriminating step, the information processing apparatus detects a plurality of control programs in which if the first control program is installed, control programs stored in the information processing apparatus become inconsistent; and
the information processing apparatus is made operative so as to update in the lump the plurality of detected control programs stored in the information processing apparatus.

23. A program according to claim 13, wherein:
said discriminating step is executed in response to the connection of the first external processing apparatus; and
whether the second control program of the second external processing apparatus which has already been stored in the information processing apparatus becomes inconsistent when the first control program is installed or not is discriminated by the identification information of the first external processing apparatus received from the first external processing apparatus.

24. A program according to claim 23, wherein the identification information of the first external processing apparatus is received in response to the first external processing apparatus being connected to the information process apparatus via a network.

25. The computer-readable medium which stores the control program according to any one of claims 13 to 24.

26. A control method of controlling an information processing apparatus having program installing means for receiving identification information of a first external processing apparatus in response to a connection of the first external processing apparatus and installing a first control program corresponding to the first external processing apparatus into said information processing apparatus, comprising:

a discriminating step of discriminating whether or not, when the first control program is installed by the program installing means, a second control program corresponding to the second external processing apparatus which has already been stored in the information processing apparatus becomes inconsistent; and a control step of controlling the program installing means to start installing the first control program into the information processing apparatus if said discriminating step discriminates that the second control program does not become inconsistent when the first control program is installed, and for updating the second control program to avoid becoming inconsistent and then controlling the program installing means to install the first control program into the information processing apparatus if said discriminating step discriminates that the second control program becomes inconsistent when the first control program is installed.

27. A method in an information processing apparatus having program installing means for receiving identification information of a first external processing apparatus in response to a connection of the first external processing apparatus and installing a first control program corresponding to the first external processing apparatus into the information processing apparatus, comprising:

a discriminating step of discriminating whether or not, when the first control program is installed by the program installing means, a second control program corresponding to a second external processing apparatus which has already been stored in the information processing apparatus becomes inconsistent; and a control step of controlling the information processing apparatus in a manner such that if it is determined in said discriminating step that the second control program does not become inconsistent when the first control program is installed, the first control program is installed into said information processing apparatus by the program installing means, and if it is determined by said discriminating step that the second control program becomes inconsistent when the first control program is installed, the installation of the first control program by the program installing means is not started.

28. A method according to claim 26, wherein said discriminating step makes a discrimination before the installation of the first control program is started; and wherein said method further comprises a notifying step of notifying the apparatus of information indicating a result of the discrimination in said discriminating step before the installation of the first control program by the program installing means is started.

* * * * *

UNITED STATES PATENT AND TRADEMARK OFFICE
CERTIFICATE OF CORRECTION

PATENT NO. : 7,047,528 B2
APPLICATION NO. : 10/232312
DATED : May 16, 2006
INVENTOR(S) : Mitsunori Iida It is certified that error appears in the above-identified patent and that said Letters Patent is hereby corrected as shown below:

ON THE TITLE PAGE, AT ITEM (56), References Cited, Page 2:
Other Publications, "contect" should read --context--.

COLUMN 4:
Line 17, "differs" should read --differs for--.

COLUMN 6:
Line 31, "prepared" should read --prepared for--.

COLUMN 8:
Line 29, "2.0" should not be bold.

COLUMN 9:
Line 15, "method of" should read --method for--.

COLUMN 16:
Line 53, "mines" should read --mines that--.

Signed and Sealed this

Nineteenth Day of June, 2007

JON W. DUDAS
*Director of the United States Patent and Trademark Office*